(No Model.)
J. F. WEINHEIMER & U. G. ORR.
SEWER TRAP.
No. 552,215. Patented Dec. 31, 1895.
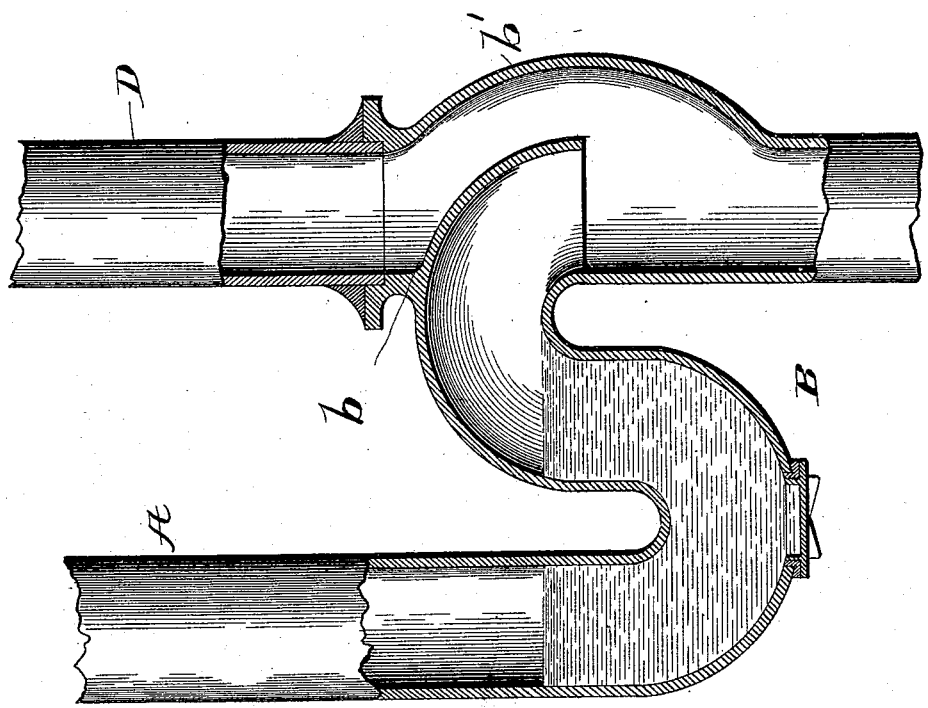
Witnesses
Inventors
Attorneys

UNITED STATES PATENT OFFICE.

JOHN F. WEINHEIMER AND ULYSSES G. ORR, OF BUFFALO, NEW YORK.

SEWER-TRAP.

SPECIFICATION forming part of Letters Patent No. 552,215, dated December 31, 1895.

Application filed September 9, 1893. Serial No. 485,191. (No model.)

*To all whom it may concern:*

Be it known that we, JOHN F. WEINHEIMER and ULYSSES G. ORR, citizens of the United States, residing at Buffalo, in the county of Erie and State of New York, have invented certain new and useful Improvements in Sewer-Traps; and we do hereby declare the following to be a full, clear, and exact description of the invention, such as will enable others skilled in the art to which it appertains to make and use the same.

Our invention consists of an improvement in sewer-traps and embodies the idea of continuing or extending the walls of the discharge end of the trap into the outlet-pipe and downwardly past the mouth of the vent-pipe, which we preferably locate over the outlet-pipe.

In the ordinary construction the discharge end of the trap is flush with the walls of the outlet-pipe with the result that the sewage is discharged against the opposite wall of the outlet-pipe, which pipe together with the vent-pipe eventually becomes clogged by accumulated deposits. By extending the upper walls of the trap as shown in the drawings, the sewage is given a forcible downward movement when discharged from the trap, which materially aids in keeping the outlet-pipe free from deposits of sewage.

In order that our invention may be clearly understood we have illustrated it in the accompanying drawing, a description of which will appear in the specification following, similar letters of reference indicating identical parts throughout.

The figure is a partial sectional view of our improved trap and outlet-pipe.

The sewer-pipe A is provided with a trap B of ordinary construction, except that a portion $b$ of the wall is extended into the outlet-pipe C and past the vent-pipe D, which is located over the outlet-pipe. The outlet-pipe may be bowed out, if desired, opposite the discharge end of the trap, as at $b'$, although this construction is not absolutely essential.

It is obvious that sewage passing from the trap B will be given a downward movement which will tend to keep the outlet-pipe clear. It is also evident that the trap and outlet-pipe may be cast integral, or the extension $b$ may be made separately and secured in the proper location to act as above described.

Another feature of our invention is the manner of connecting the vent-pipe to the trap. The part $D'$ is provided with an annular flange $d$ and an annular recess $d'$. The end of the pipe D is placed in the recess $d'$ and the solder applied upon the flange $d$ and around the pipe D, as shown at $d^2$, making a perfect joint. By this construction much time and labor are saved in the work of connecting the parts, and at the same time there is eliminated the danger of having solder run down on the inside of the trap, which when hardened tends to catch particles of sewage and clog the exit. It will be understood, however, that we may if we desire use other means of connecting the vent-pipe and trap, such as the ordinary screw-threaded connection, &c., but the form avove described is our preferred form.

What we claim, and desire to secure by Letters Patent, is—

1. The combination with the outlet pipe and the sewer trap, of the rigid shield forming an extension of the trap pipe and affording a discharge opening of the size of the trap pipe in line with the outlet pipe, and the vent pipe, substantially as described.

2. The combination with the outlet pipe and the sewer trap, the said outlet pipe being enlarged at the point of juncture with the trap, of the rigid shield forming an extension of the trap pipe and affording a discharge opening of the size of the trap pipe in line with the outlet pipe and the vent pipe, substantially as described.

In testimony whereof we affix our signatures in presence of two witnesses.

JOHN F. WEINHEIMER.
ULYSSES G. ORR.

Witnesses:
NELSON T. BARRETT,
OTTO F. LAUGENBACH.